United States Patent
Oesterling et al.

(10) Patent No.: US 7,636,626 B2
(45) Date of Patent: Dec. 22, 2009

(54) METHOD AND SYSTEM FOR MONITORING AND RETRIEVING DEVICE USAGE

(75) Inventors: Christopher L. Oesterling, Troy, MI (US); Richard Heald, Birmingham, MI (US); Michael L. Peterson, Waterford, MI (US); Matt C. Videtich, Farmington Hills, MI (US)

(73) Assignee: General Motors Company, Detroit, MI (US)

( * ) Notice: Subject to any disclaimer, the term of this patent is extended or adjusted under 35 U.S.C. 154(b) by 513 days.

(21) Appl. No.: 11/091,175

(22) Filed: Mar. 28, 2005

(65) Prior Publication Data
US 2006/0217875 A1    Sep. 28, 2006

(51) Int. Cl.
*G05B 19/18* (2006.01)
(52) U.S. Cl. ................... 701/200; 340/901
(58) Field of Classification Search ............ 701/25, 701/29–32, 34–36, 200; 340/901, 902, 425.5, 340/438, 439, 459
See application file for complete search history.

(56) References Cited

U.S. PATENT DOCUMENTS

| | | | |
|---|---|---|---|
| 5,815,093 A * | 9/1998 | Kikinis | 340/937 |
| 5,970,390 A | 10/1999 | Koga et al. | |
| 6,141,610 A * | 10/2000 | Rothert et al. | 701/35 |
| 6,493,546 B2 | 12/2002 | Patsiokas | |
| 6,505,780 B1 | 1/2003 | Yassin et al. | |
| 6,813,526 B1 * | 11/2004 | Dodd, Jr. | 700/65 |
| 6,925,425 B2 * | 8/2005 | Remboski et al. | 702/188 |
| 6,950,638 B2 | 9/2005 | Videtich et al. | |
| 6,978,152 B1 | 12/2005 | Yamaashi et al. | |
| 6,988,034 B1 * | 1/2006 | Marlatt et al. | 701/200 |
| 2001/0037210 A1 | 11/2001 | Hirayama | |
| 2001/0037378 A1 | 11/2001 | Hirayama | |
| 2003/0144005 A1 | 7/2003 | Videtich | |
| 2003/0194977 A1 | 10/2003 | Videtich et al. | |
| 2003/0203714 A1 | 10/2003 | Videtich et al. | |
| 2003/0236075 A1 | 12/2003 | Johnson et al. | |
| 2004/0121748 A1 | 6/2004 | Glaza | |
| 2004/0142659 A1 * | 7/2004 | Oesterling | 455/11.1 |
| 2004/0192404 A1 | 9/2004 | Zenios et al. | |
| 2004/0204069 A1 * | 10/2004 | Cui et al. | 455/557 |
| 2005/0049002 A1 | 3/2005 | White et al. | |
| 2005/0136902 A1 | 6/2005 | Mazzara | |
| 2006/0040609 A1 | 2/2006 | Petschke et al. | |
| 2006/0046649 A1 | 3/2006 | Videtich | |
| 2006/0057956 A1 | 3/2006 | Grau et al. | |

* cited by examiner

*Primary Examiner*—Dalena Tran

(57) ABSTRACT

A method and system for monitoring and retrieving device usage for a device at a vehicle including storing a vehicle data record in the telematics unit, monitoring the device usage for device data, storing the device data at the vehicle, requesting the telematics unit to upload the device data, and transmitting the device data from the telematics unit to a remote location. At least one of the monitoring and the requesting is performed in accordance with the vehicle data record.

9 Claims, 2 Drawing Sheets

METHOD AND SYSTEM FOR MONITORING AND RETRIEVING DEVICE USAGE

RELATED APPLICATIONS

This application is related to U.S. patent application Ser. No. 11/091194, to Beiermeister, et al., entitled Vehicle Component Usage Monitor, filed Mar. 28 2005, and incorporated herein by reference.

FIELD OF THE INVENTION

The invention relates to vehicles, and more particularly to methods and systems for monitoring and retrieving device usage from vehicles.

BACKGROUND OF THE INVENTION

Vehicles are increasingly equipped with one or more information and entertainment devices capable of receiving signals or playing portable media. Examples of such devices are conventional radio receivers, satellite radio receivers, cassette tape players, and compact disc (CD) players. New formats and media, such as MP3 and Digital Versatile Discs (DVDs), are added to vehicles as they become popular. Gradually, the new technology devices replace the old.

Yet, there is no way for the manufacturer of the vehicle or information and entertainment devices to directly determine how and when the customers are using the devices, let alone parsing usage data to identify different user groups, as required to manage effective marketing and to make design decisions.

Customers can be surveyed individually regarding their usage with expensive live or email surveys, however, the compiled data may not be reliable. Customers often have difficulty accurately estimating their usage. The data is likely to be skewed because people who are excited about certain devices are more likely to be willing to take a survey than people who are not. In addition, the lag times and costs associated with survey data make market research an impractical tool for influencing marketing communications in the short term. For example, a satellite radio service provider giving free trial usage with the purchase of a vehicle would not be able to identify a customer with low usage and provide additional information to the customer before the trial period ends. Customers who use a satellite radio service early in the trial period are significantly more likely to renew the service, so failure to identify a low usage customer during the trial period often results in a lost subscription after the trial period.

Another problem from the lack of customer use data is marketing inefficiency. Heavy users of a particular information and entertainment device are likely to renew subscriptions associated with the device. Therefore, there is less need to contact the heavy user with direct communications, such as direct mail or outbound telemarketing. Direct communication targeted to heavy users results in unnecessary expense for the subscription provider and potential annoyance for the valued subscriber.

It would be desirable to have a method and system for monitoring and retrieving device usage from vehicles that overcomes the above disadvantages.

SUMMARY OF THE INVENTION

The present invention provides a method for monitoring and retrieving device usage for a device at a vehicle including storing a vehicle data record in the telematics unit, monitoring the device usage for device data, storing the device data at the vehicle, requesting the telematics unit to upload the device data, and transmitting the device data from the telematics unit to a remote location. At least one of the monitoring and the requesting is performed in accordance with the vehicle data record.

Another aspect of the invention provides a system for monitoring and retrieving device usage for a device at a vehicle including means for storing a vehicle data record in the telematics unit, means for monitoring the device usage for device data, means for storing the device data at the vehicle, means for requesting the telematics unit to upload the device data, and means for transmitting the device data from the telematics unit to a remote location. At least one of the means for monitoring and the means for requesting is responsive to the vehicle data record.

Yet another aspect of the invention provides a computer readable medium for monitoring and retrieving device usage for a device at a vehicle including computer readable code for storing a vehicle data record in the telematics unit, computer readable code for monitoring the device usage for device data, computer readable code for storing the device data at the vehicle, computer readable code for requesting the telematics unit to upload the device data, and computer readable code for transmitting the device data from the telematics unit to a remote location. At least one of the computer readable code for monitoring and the computer readable code for requesting is responsive to the vehicle data record.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
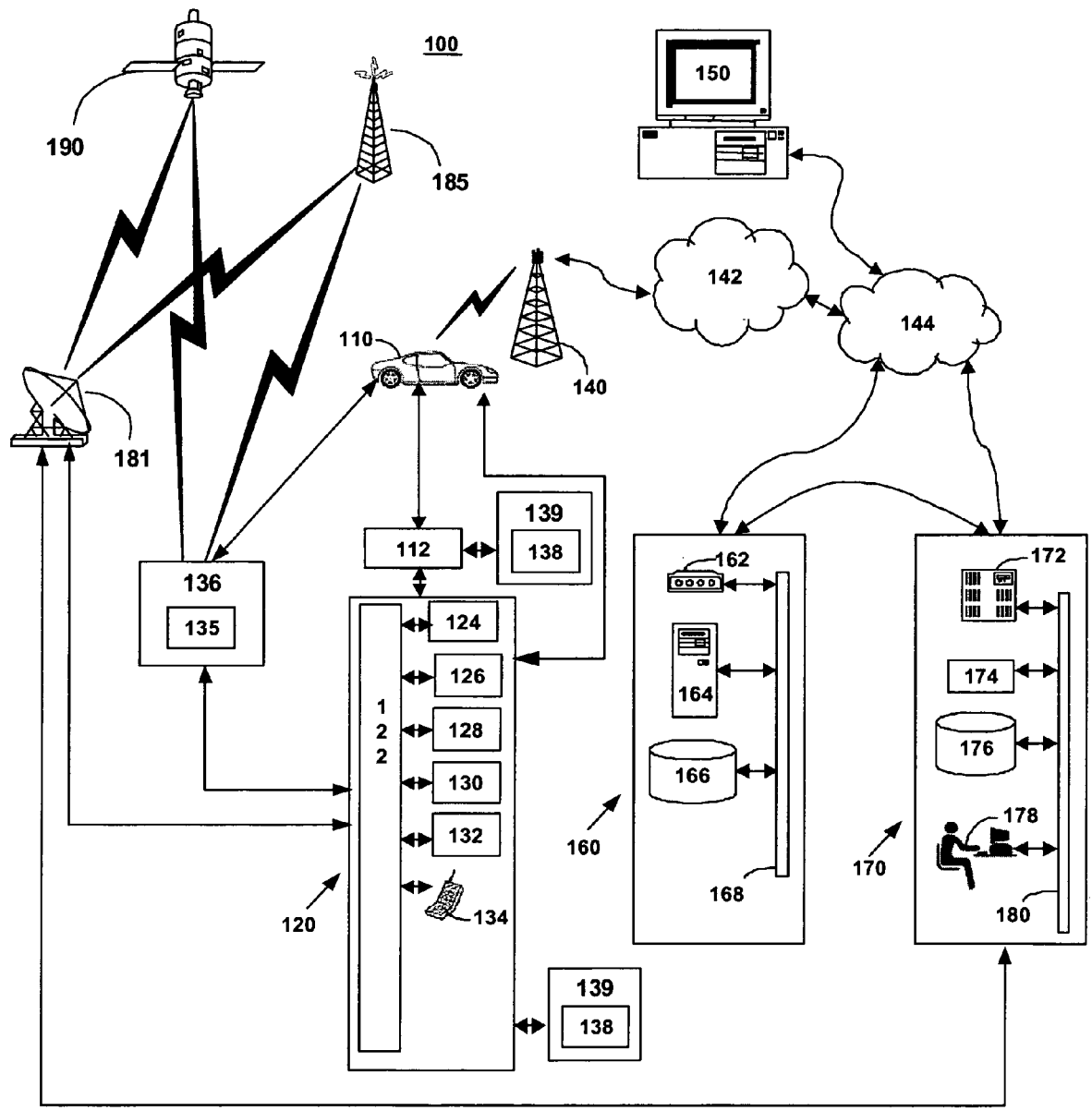
FIG. 1 is an illustrative operating environment for monitoring and retrieving device usage in accordance with one embodiment of the present invention.

FIG. 1 is an illustrative operating environment for monitoring and retrieving device usage in accordance with one embodiment of the present invention. FIG. 1 shows a mobile vehicle communication system 100. System 100 includes at least one mobile vehicle 110 (vehicle) including vehicle communication network 112 and telematics unit 120; a satellite radio receiver system 136; one or more wireless carrier systems 140; one or more communication networks 142; one or more land networks 144; one or more client, personal, or user computers 150; one or more web-hosting portals 160; one or more call centers 170; one or more satellite radio service uplink facilities 181; one or more terrestrial radio transmitters 185; and one or more satellite radio service geostationary satellites 190. In one embodiment, mobile vehicle 110 is implemented as a vehicle equipped with suitable hardware and software for transmitting and receiving voice and data communications. The telematics unit 120 is also called a vehicle communications unit (VCU) or a telematics device.

The telematics unit 120 can be operably connected to devices 139 directly and/or through the vehicle communication network 112. The devices 139 can include device storage 138 for storing device data, such as time data, channel data, or the like.

In one embodiment, the telematics unit 120 includes a processor 122 connected to a wireless modem 124, a global positioning system (GPS) unit 126, an in-vehicle memory 128 such as, for example, a non-volatile flash memory or a hard drive, a microphone 130, one or more speakers 132, and an embedded or in-vehicle mobile phone 134. The telematics unit 120 is responsive to instructions, such as vehicle data records, to perform certain operations. In one embodiment, processor 122 is a microcontroller, controller, host processor, or vehicle communications processor. In an example, processor 122 is implemented as an application specific integrated circuit (ASIC). GPS unit 126 provides longitude and latitude coordinates of the vehicle, as well as a time and date stamp. The in-vehicle memory 128 is operable to store instructions for the telematics unit 120, such as vehicle data records, and/or data, such as device data. In one embodiment, at least part of the in-vehicle memory 128 is removable for use outside the vehicle 110. In-vehicle mobile telephone system 134 is a cellular-type phone such as, for example, an analog, digital, dual-mode, dual-band, multi-mode, or multi-band cellular phone. In another example, the mobile telephone system is an analog mobile telephone system operating over a prescribed band nominally at 800 MHz. In yet another example, the mobile telephone system is a digital mobile telephone system operating over a prescribed band nominally at 800 MHz, 900 MHz, 1900 MHz, or any suitable band capable of carrying digital cellular communications. The components of the telematics unit 120 can be distributed throughout the vehicle and need not be mounted within a single enclosure.

Processor 122 executes various computer programs and communication control and protocol algorithms that affect communication, programming, and operational modes of electronic and mechanical systems within vehicle 110. In one embodiment, processor 122 is an embedded system controller. In another embodiment, processor 122 controls communications between telematics unit 120, wireless carrier system 140, call center 170, terrestrial radio transmitter 185, and satellite radio geostationary satellite 190. In yet another embodiment, processor 122 controls communications between the wireless modem 124 and nodes of a mobile ad hoc network. In still another embodiment, processor 122 provides processing, analysis, and control functions for determining engine emission performance for vehicle 110. Processor 122 is configured to generate and receive digital signals transmitted between telematics unit 120 and a vehicle communication network 112 that is connected to various electronic modules in the vehicle 110. In one embodiment, the digital signals activate a programming mode and operation modes, as well as provide for data transfers. In another embodiment, a utility program facilitates the transfer of emission data, emission analysis data, instructions, triggers, and data requests between vehicle 110 and a call center 170.

Mobile vehicle 110, via a vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the S band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, a virtual private network (VPN), or any combination thereof. Land network 144 is connected to one or more landline telephones. Land network 144 connects communication network 142 to computer 150, web-hosting portal 160, and call center 170. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160 and vehicle 110. Computer 150 sends data to web-hosting portal 160 through a web-page interface using communication standards such as hypertext transport protocol (HTTP) and transport-control protocol Internet protocol (TCP/IP). In one embodiment, the data includes directives to change certain programming and operational modes of electronic and mechanical systems within vehicle 110. In another embodiment, the data includes requests for certain data, such as vehicle system performance information. In operation, a user, such as, for example, a vehicle designer or manufacturing engineer, utilizes computer 150 to exchange information with mobile vehicle 110 that is cached or stored in web-hosting portal 160. In an embodiment, vehicle system performance information from client-side software is transmitted to server-side software of web-hosting portal 160. In one embodiment, vehicle system performance information is stored at web-hosting portal 160. In another embodiment, computer 150 includes a database (not shown) for storing received vehicle system performance data. In yet another embodiment, a private Local Area Network (LAN) is implemented for client computer 150 and web-hosting portal 160, such that web-hosting portal is operated as a Virtual Private Network (VPN).

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. Web-hosting portal 160 is connected to land network 144 by one or more data modems 162. Land network 144 transmits digital data to and from modem 162, data that is subsequently transferred to web server 164. In one implementation, modem 162 resides inside web server 164. Land network 144 transmits data communications between web-hosting portal 160 and call center 170.

Web server 164 receives various data, requests, or instructions from computer 150 via land network 144. In alternative embodiments, computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from computer 150 to telematics unit 120 in vehicle 110. Web server 164 sends to or receives data transmissions from one or more databases 166 via network 168. In an embodiment, web server 164 includes computer applications and files for managing emission performance data.

In one embodiment, one or more web servers 164 are networked via network 168 to distribute vehicle engine emission performance data among its network components such as database 166. In an example, database 166 is a part of or a separate computer from web server 164. In one embodiment, web-server 164 sends data transmissions including vehicle system performance information to call center 170 via modem 162, and through land network 144.

Call center 170 is a location where many calls are received and serviced at the same time, or where many calls are sent at the same time. In one embodiment, the call center is a telematics call center, facilitating communications to and from telematics unit 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics unit 120 in mobile vehicle 110 through wireless carrier system 140 and/or wireless modem 124, communication network 142, and land network 144. Switch 172 receives data transmissions from and sends data transmissions to one or more web-hosting portals 160. Switch 172 receives data transmissions from or sends data transmissions to one or more communication services managers 174 via one or more networks 180.

Communication services manager 174 is any suitable hardware and software capable of providing communication services to telematics unit 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends voice or data transmissions to switch 172.

Communication services manager 174 facilitates one or more services, such as, but not limited to, enrollment services, navigation assistance, directory assistance, roadside assistance, business or residential assistance, information services assistance, emergency assistance, communications assistance, and telematics retrieval of vehicle system performance information. Communication services manager 174 transmits and receives operational status, instructions, and other types of vehicle data to telematics unit 120 in mobile vehicle 110 through wireless carrier system 140, communication network 142, land network 144, wireless modem 124, voice and data switch 172, and network 180. Communication services manager 174 stores or retrieves vehicle system performance information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at a service provider service center in verbal communication with a service subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics unit 120, which, in turn, sends an instructional signal or a voice call through wireless modem 124, wireless carrier system 140, communication network 142, and land network 144 to call center 170. In one embodiment, one or more triggers stored in the telematics unit 120 cause the vehicle to initiate a service request. The trigger is, for example, a number of ignition cycles, a specific time and date, an expired time, a number of kilometers, an absolute Global Positioning System (GPS) timestamp, a request for vehicle emission performance data, and the like.

A Satellite Based Digital Radio Service System (SDARS) provides radio programming from geostationary satellite 190 to vehicle 110. The SDARS system includes a satellite radio uplink facility 181 in communication with the telematics service call center 170 that sends radio signals to the geostationary satellite 190. The geostationary satellite 190 transmits radio signals to satellite radio receiver system 136 in vehicle 110. In one embodiment, the terrestrial radio transmitter 185 transmits radio signals to satellite radio receiver system 136 in vehicle 110. The terrestrial radio transmitter 185 can carry out the same functions as the geostationary satellite 190 when the vehicle 110 is within range of the terrestrial radio transmitter 185. Those skilled in the art will appreciate that the SDARS can be used to transmit any digital information, such as video programming.

In one embodiment, the terrestrial radio transmitter 185 and geostationary satellite 190 broadcast over a spectrum in the S band (2.3 GHz) that has been allocated by the U.S. Federal Communications Commission (FCC) for nationwide broadcasting of Satellite Based Digital Radio Service (SDARS). An exemplary broadcast has a 120 kilobit per second portion of the bandwidth designated for command signals from the telematics service call center 170.

The SDARS system broadcasts music and entertainment, traffic information, road construction information, advertisements, news, local event information, and the like. The SDARS system can also transmit information about the program being broadcast. In one embodiment, the information includes the names of the program and program artist. For example, if the program is a song, the information can include the name of the song and the artist.

In one embodiment, the satellite radio receiver system 136 is separate from the telematics unit 120. In an alternative embodiment, the satellite radio receiver system 136 is electronically connected to the telematics unit 120 with a cable or over the vehicle communication bus. In another embodiment, the satellite radio receiver system 136 is embedded within the telematics unit 120. In one embodiment, the satellite radio receiver system 136 provides channel and signal information to the telematics unit 120. The telematics unit 120 monitors, filters and sends signals that are received from satellite broadcast, radio broadcasts or other wireless communication systems to output devices, such as the speaker 132 and visual display devices. In another embodiment, the signals from the satellite radio receiver system 136 are sent directly to independent output devices, such as speakers and visual display devices, without the intervening telematics unit 120. The satellite radio receiver system 136 can include device storage 135 for storing device data, such as time data, channel data, or the like.

The devices 139 can be any vehicle devices in communication with the telematics unit 120. The devices 139 can be electrical or electronic devices, such as information and entertainment devices, conventional radio receivers, satellite radio receivers, cassette tape players, compact disc (CD) players, onboard computers, and the like. One example of an electronic device is the satellite radio receiver system 136. The devices 139 can also be mechanical devices, such as door hinges, trunk hinges, door latches, and the like, fitted with suitable sensors to provide direct indication or providing indirect indication to the telematics unit 120. In one embodiment, the devices 139 communicate with the telematics unit 120 through the vehicle communication network 112. In an alternate embodiment, the devices 139 communicate with the telematics unit 120 directly. Those skilled in the art will appreciate that any number of devices 139 of various types can be in communication with the telematics unit 120 to provide device data to the telematics unit 120.

Device data for the devices 139, such as time data, channel data, or the like, can be stored at the vehicle devices, such as the device storage 138 in the devices 139 or the device storage 135 in the satellite radio receiver system 136. Device data can also be stored at the in-vehicle memory 128 of the telematics unit 120. The device storage 135,138 and/or in-vehicle memory 128 store the device data until the device data is transmitted over the mobile vehicle communication system 100 to a remote facility, such as one or more web-hosting portals 160 or one or more call centers 170.

Figure 2:
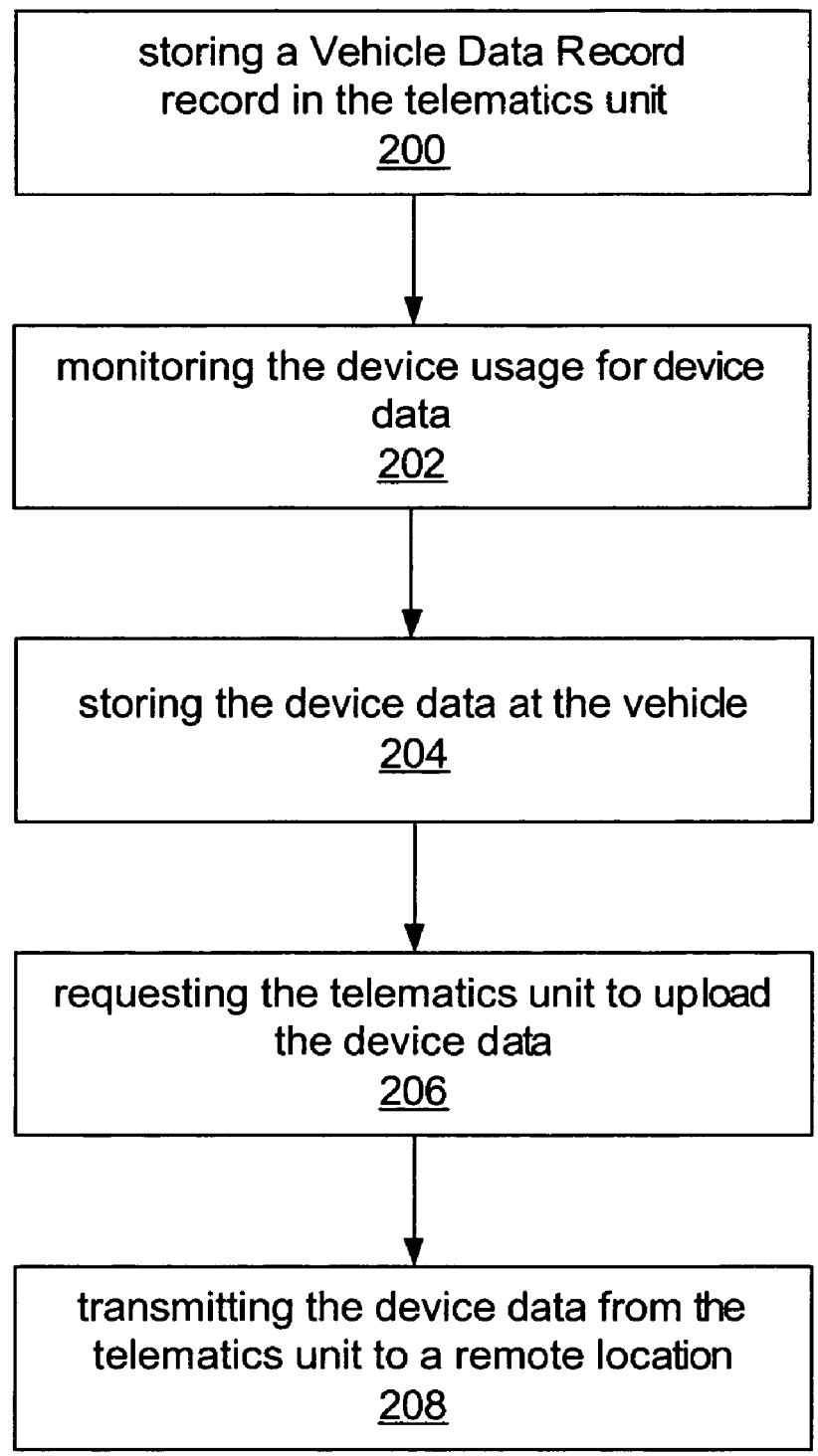
FIG. 2 is a flow diagram of a method for monitoring and retrieving device usage in accordance with one embodiment of the present invention.

FIG. 2 is a flow diagram of a method for monitoring and retrieving device usage in accordance with one embodiment of the present invention. The method includes storing a vehicle data record in the telematics unit 200, monitoring the device usage for device data 202, storing the device data at the vehicle 204, requesting the telematics unit to upload the device data 206, and transmitting the device data from the telematics unit to a remote location 208, wherein at least one of the monitoring 202 and the requesting 206 is performed in accordance with the vehicle data record. The method operates within an environment and using a system such as the exemplary system of FIG. 1. The method is embodied in a computer usable medium for monitoring and retrieving device usage including computer readable code for executing the method described by FIG. 2.

Storing a vehicle data record in the telematics unit 200 includes storing a vehicle data record in the telematics unit to provide instruction as to storing device data and/or requesting the telematics unit to upload the device data. Typically, the vehicle data record is stored in the in-vehicle memory of the telematics unit. The vehicle data record is responsive to activity detected at the telematics unit to execute instructions.

Monitoring the device usage for device data 202 includes monitoring the device usage at the device and/or at the telematics unit. The device can be monitored for any device data desired and appropriate for the type of device, such as time data and/or channel data. In one example, the device usage is monitored in the telematics unit in accordance with a usage monitor vehicle data record. In another example for the device as a satellite radio receiver system, the receiver system can be monitored for the time data for which the receiver system is in use, such as the time the receiver system is turned on and the duration of use. The time data can be monitored in discrete increments, such as one minute, fifteen minute, or one hour increments, as appropriate for a particular use. Channel data, such as the satellite radio channel to which the driver is listening, can also be monitored. Those skilled in the art will appreciate that any number of device data can be monitored to acquire particular information for a desired purpose.

Storing the device data at the vehicle 204 includes storing the device data at the vehicle in device storage of the device and/or in-vehicle memory of the telematics unit. The storing can be directed by the device and/or by the telematics unit.

Requesting the telematics unit to upload the device data 206 includes the telematics unit or the remote location, such as a call center, making the request. In one embodiment, the requesting includes the telematics unit initiating a call to the call center in accordance with a call interval vehicle data record after a time interval passes. The telematics unit can then upload the device data once connected with the call center. In an alternative embodiment, the requesting includes the remote location, such as a call center, calling the telematics unit during a telematics unit wake-up cycle while the vehicle is off. The telematics unit can upload the device data when connected with the call center.

Transmitting the device data from the telematics unit to a remote location 208 includes transmitting the device data from the telematics unit to a remote location, such as a call center. When the device data is stored in the device storage in the vehicle device, such as in the satellite radio receiver system, the device data is shifted from the device storage in the vehicle device to the in-vehicle memory in the telematics unit, and then transmitted to the remote location. When the device data is stored in the in-vehicle memory in the telematics unit, the device data is transmitted directly from the telematics unit to the remote location.

The method can be repeated to acquire device data over time and make decisions based on raw data and/or trends. In one embodiment, the transmitting the device data from the telematics unit to a remote location 208 includes transmitting first device data at a first time. The device usage is monitored for second device data, which is stored at the vehicle. The telematics unit is requested to upload the second device data, and the second device data is transmitted from the telematics unit to a remote location at a second time. The first device data and the second device data are compared to determine a device usage difference between the first time and the second time. By compiling a number of device usage differences over a number of time intervals, trends can be determined and decisions made based on those trends. The trends can be analyzed for a particular vehicle owner, for vehicle owners in general, or for a limited vehicle owner population of interest, such as vehicle owners of a particular make, model year, body style, or any other particular classification. In one embodiment, the device usage differences are aggregated for a plurality of vehicles.

The decision making can also draw on other available information, such as available information about the vehicle owner. Examples of decisions include marketing decisions, such as marketing strategies for particular consumers and consumers in general, and design decisions, such as design features for particular devices and selection of devices which should be included in the vehicles. In one example, the satellite radio receiver system listening habits of a particular vehicle owner could be determined and a decision made to send subscriber credits to the user to encourage use of the satellite radio receiver system. In another example, satellite radio receiver system listening habits of vehicle owners of 2005 Chevrolet trucks could be determined and a decision made whether to include the satellite radio receiver system as a standard feature.

Baseline device data can be acquired when the new or used vehicle is purchased. A customer delivery record (CDR) is received at the remote location, and a vehicle start vehicle data record is stored at the telematics unit in response to the CDR. Baseline device data from the telematics unit is uploaded to the remote location in accordance with the vehicle start vehicle data record after a vehicle start The various aspects of the present invention can be combined to suit diverse applications, as illustrated by the following examples.

The first example is tracking satellite radio receiver system usage by a vehicle purchaser. A free trial subscription to a satellite radio service, such as a 90 day subscription, is provided to the vehicle purchaser. Retaining the vehicle purchaser as a paid satellite radio service subscriber after the free trial subscription often depends on whether the vehicle purchaser understands and uses the satellite radio service during the free trial period.

When a new or used vehicle is sold, a customer delivery record (CDR) is generated and received at the call center. The call center generates a vehicle ignition vehicle data record during the telematics unit enrollment process and stores the vehicle ignition vehicle data record at the telematics unit in response to the CDR. The vehicle ignition vehicle data record directs the telematics unit to call the call center when the vehicle ignition cycle is complete. After the vehicle ignition cycle completes, the telematics unit calls the call center, and baseline device data showing the present satellite radio receiver system usage is uploaded from the telematics unit to the call center in accordance with the vehicle ignition vehicle data record. The call center now has a baseline satellite radio receiver system time data for the new vehicle owner.

The call center then stores a call interval vehicle data record at the telematics unit. The call interval vehicle data record directs the telematics unit to call the call center after a time interval, such as 30 days. The satellite radio receiver system usage is monitored for time data and the cumulative time of use is stored in the device storage of the satellite radio receiver system. In one embodiment, the time data is stored in discrete amounts, such as 15 minute increments. After the time interval has run, the telematics unit calls the call center and the telematics unit uploads the current device data in accordance with the call interval vehicle data record. The call center now has a 30 day satellite radio receiver system time data and a baseline satellite radio receiver system time data for the new vehicle owner.

The 30 day satellite radio receiver system time data and the baseline satellite radio receiver system time data can be compared to determine the satellite radio receiver system usage difference between the vehicle delivery and 30 days. A marketing decision about how to market to the new vehicle owner, such as by telephone, email, or regular mail, can be made based on the usage difference. If the new vehicle owner is using the satellite radio receiver system a great deal, the marketing decision can be to maintain the current level of marketing, or even to reduce the number of contacts to save money and avoid annoying the new vehicle owner. If the new vehicle owner is using the satellite radio receiver system very little, the marketing decision can be to increase the marketing to make sure the new vehicle owner understands the satellite radio receiver system and to encourage use.

The process can be repeated as desired, such as at additional 30 day intervals at 60 and 90 days after purchase, to monitor usage trends and marketing effectiveness. After the last time interval of usage monitoring, all call interval vehicle data records can be removed from the telematics unit.

The second example is tracking usage for a device, such as a satellite radio receiver system, and transmitting the device usage to the call center when the vehicle is off. A usage monitor vehicle data record is stored in the telematics unit. The usage monitor vehicle data record directs the telematics unit to monitor satellite radio receiver system usage for device data, such as time of use, channel use, and the like, and store the device data in the in-vehicle memory of the telematics unit. The telematics unit monitors the satellite radio receiver system usage. The call center then requests the telematics unit to upload the device data by calling the telematics unit from the call center during a telematics unit wake-up cycle while the vehicle is off. Typically, the telematics unit is inactive and unreachable from the call center when the vehicle is off. The telematics unit wake-up cycle is a known time or times for each vehicle when the telematics unit is available to respond to the call center even though the vehicle is off. Once contact is made between the call center and the telematics unit during the telematics unit wake-up cycle, the telematics unit can be energized to perform various functions, such as data upload, vehicle data record receipt, and the like. After the device data is transmitted from the telematics unit to the call center, the call center can instruct the telematics unit to return to the inactive state.

The third example is tracking usage for a device over time, and making design and marketing decisions based on the raw data and/or trends. The device in this example is an information or entertainment device, such as a conventional radio receiver, satellite radio receiver, cassette tape players, compact disc (CD) player, or the like.

The usage time data is typically stored in discrete amounts in device storage at the device, but can alternatively be stored in the telematics unit. For storage at the device, a call interval vehicle data record is stored in the telematics unit, the device usage is monitored to obtain device data, such as time data, channel data, and the like, and the device data is stored at the device. The call interval vehicle data record directs the telematics unit to call the call center at a time interval, such as daily, weekly, monthly, or any other desired time interval, at which times the device data is transmitted from the telematics unit to the call center. For storage at the telematics unit, a usage monitor vehicle data record is stored in the telematics unit, the device usage is monitored to obtain device data, such as time data, channel data, and the like, and the device data is stored at the device. The usage monitor vehicle data record directs the telematics unit to monitor the device usage for device data and store the device data in the telematics unit. The device data is transmitted from the telematics unit to the call center when the telematics unit is connected to the call center, daily, weekly, monthly, or any other desired time interval.

The process of monitoring the device usage for device data, storing the device data at the vehicle, requesting the telematics unit to upload the device data, and transmitting the device data from the telematics unit to a remote location is performed at a first time to acquire first device data and repeated at a second time to acquire second device data. The process can be repeated additional times as desired. The first device data is compared to the second device data to determine a device usage difference between the first time and the second time. The device usage difference indicates the daily, weekly, or monthly device usage.

A number of device usage differences can be compiled for a number of time intervals to indicate trends in device usage. Decisions, such as marketing decisions, design decisions, and the like, can be made based on the device usage differences, i.e., the indicated trends. One example of a marketing decision is deciding to provide coupons or promotional brochures to a satellite radio service subscriber when the satellite radio service subscriber's usage declines.

The plurality of device usage differences for a plurality of time intervals can also be aggregated for a plurality of vehicles. Decisions, such as marketing decisions, design decisions, and the like, can be made based on the aggregated plurality of device usage differences. The plurality of vehicles can also be selected as a limited population of interest, such as vehicles of a particular make, model year, body style, or any other particular classification. One example of a marketing decision is deciding to advertise on particular subscriber channels of a Satellite Based Digital Radio Service System (SDARS) indicated by aggregated channel data as being popular with luxury vehicle owners. One example of a design decision is deciding to redesign a particular model of a satellite radio receiver system that the aggregated device usage indicates is less popular than similar satellite radio receiver systems. Another example of a design decision is deciding to eliminate cassette tape players when the aggregated device usage indicates declining popularity.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:

1. A method for monitoring and retrieving device usage for a device at a vehicle, the method comprising:
   storing a vehicle data record in a telematics unit;
   monitoring a vehicle device and acquiring device usage data;
   storing the device usage data at the vehicle;
   initiating a call between the telematics unit and a call center via a wireless carrier system based on the vehicle data record;
   accessing the device usage data stored at the vehicle; and
   transmitting the device usage data using the call between the telematics unit and the call center;
   wherein the method further comprises the steps of:
   receiving a customer delivery record (CDR) at a remote location;
   storing a vehicle ignition vehicle data record at the telematics unit in response to the CDR; and
   uploading baseline device data from the telematics unit to a call center in accordance with the vehicle ignition vehicle data record after a vehicle start.

2. A method for monitoring and retrieving device usage for a device at a vehicle, the method comprising:
   storing a vehicle data record in a telematics unit;
   monitoring the device usage for device data;
   storing the device data at the vehicle;
   requesting the telematics unit to upload the device data by calling the telematics unit from a remote location during a telematics unit wake-up cycle while the vehicle is off; and
   transmitting the device data from the telematics unit to the remote location;
   wherein at least one of the monitoring and the requesting is performed in accordance with the vehicle data record.

3. The method of claim 2 wherein the device data is selected from the group consisting of time data and channel data.

4. The method of claim 2 wherein the step of storing the device data at the vehicle further comprises: storing the device data at a location selected from the group consisting of device storage at the device and in-vehicle memory at the telematics unit.

5. The method of claim 2 further comprising:
   receiving a customer delivery record (CDR);
   storing a vehicle ignition vehicle data record at the telematics unit in response to the CDR; and
   uploading baseline device data from the telematics unit to the remote location in accordance with the vehicle ignition vehicle data record after a vehicle start.

6. The method of claim 2 wherein:
   the vehicle data record is a call interval vehicle data record; and the step of monitoring the device usage for device data comprises requesting the telematics unit to upload the device data in accordance with the call interval vehicle data record after a time interval.

7. The method of claim 2 wherein:

the vehicle data record is a usage monitor vehicle data record; and the step of monitoring the device usage for device data comprises monitoring the device usage in the telematics unit in accordance with the usage monitor vehicle data record.

8. A method for monitoring and retrieving satellite radio usage in a vehicle, the method comprising the steps of:

recording initial satellite radio usage data over a first period of time;

transmitting the initial satellite radio usage data from the telematics unit to a call center via a wireless carrier system after the first period of time;

recording additional satellite radio usage data over a second period of time;

transmitting the additional satellite radio usage data from the telematics unit to a call center via the wireless carrier system after the second period of time;

comparing the initial satellite radio usage data with the additional satellite radio usage data; and making decisions based on the comparison;

wherein the step of making decisions comprises increasing communication frequency with a vehicle user when satellite radio usage falls below predetermined values.

9. A method for monitoring and retrieving satellite radio usage in a vehicle, the method comprising the steps of:

recording initial satellite radio usage data over a first period of time;

transmitting the initial satellite radio usage data from the telematics unit to a call center via a wireless carrier system after the first period of time;

recording additional satellite radio usage data over a second period of time;

transmitting the additional satellite radio usage data from the telematics unit to a call center via the wireless carrier system after the second period of time; and comparing the initial satellite radio usage data with the additional satellite radio usage data; and making decisions based on the comparison;

wherein the step of making decisions comprises decreasing communication frequency or ceasing communications with a vehicle user when satellite radio usage rises above predetermined values.

* * * * *